(12) United States Patent
Bye et al.

(10) Patent No.: US 12,376,090 B2
(45) Date of Patent: Jul. 29, 2025

(54) PRIVATE NETWORK

(71) Applicant: DISH Wireless L.L.C., Englewood, CO (US)

(72) Inventors: Stephen Bye, Littleton, CO (US); Montgomery Groff, Denver, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 481 days.

(21) Appl. No.: 17/859,986

(22) Filed: Jul. 7, 2022

(65) Prior Publication Data

US 2024/0015713 A1    Jan. 11, 2024

(51) Int. Cl.
*H04W 72/0453* (2023.01)
*H04W 8/26* (2009.01)
*H04W 84/04* (2009.01)
*H04W 88/10* (2009.01)

(52) U.S. Cl.
CPC ......... *H04W 72/0453* (2013.01); *H04W 8/26* (2013.01); *H04W 84/042* (2013.01); *H04W 88/10* (2013.01)

(58) Field of Classification Search
CPC .. H04W 72/0453; H04W 8/26; H04W 84/042
See application file for complete search history.

(56) References Cited

U.S. PATENT DOCUMENTS

| | | | |
|---|---|---|---|
| 2007/0026868 A1* | 2/2007 | Schulz | H04M 3/367 455/454 |
| 2010/0177703 A1* | 7/2010 | daCosta | H04W 8/005 370/328 |
| 2011/0117852 A1* | 5/2011 | Copeland | H04W 48/08 455/62 |
| 2016/0066196 A1* | 3/2016 | Jiang | H04W 72/27 370/329 |

(Continued)

FOREIGN PATENT DOCUMENTS

| | | |
|---|---|---|
| CN | 114080003 A | 2/2022 |
| EP | 1667372 A1 | 6/2006 |

OTHER PUBLICATIONS

International Search Report and Written Opinion, mailed Sep. 29, 2023, for International Patent Application No. PCT/US2023/025605. (33 pages).

(Continued)

*Primary Examiner* — Joseph E Avellino
*Assistant Examiner* — Maryam Emadi
(74) *Attorney, Agent, or Firm* — Seed IP Law Group LLP

(57) ABSTRACT

Disclosed is a method performed by a first Access Point (AP) device of a private network that communicates with a fifth-generation New Radio (5G NR) cellular telecommunication radio access network (RAN). The method includes transmitting one or more first messages using a first licensed frequency band; receiving one or more second messages using the first licensed frequency band; receiving data for a user equipment device; determining a second AP device of (Continued)

the private network to which the data for the user equipment device is to be transmitted based on the one or more second messages; and transmitting the data for the user equipment device to the second AP device of the private network using a second licensed frequency band or an unlicensed frequency band.

19 Claims, 5 Drawing Sheets

(56) References Cited

U.S. PATENT DOCUMENTS

| | | | |
|---|---|---|---|
| 2018/0139691 A1* | 5/2018 | Onishi | H04W 24/10 |
| 2021/0185541 A1 | 6/2021 | Potharaju et al. | |
| 2021/0289413 A1* | 9/2021 | Files | H04W 4/027 |
| 2021/0321485 A1* | 10/2021 | Wu | H04L 45/48 |

OTHER PUBLICATIONS

3GPP, "3rd Generation Partnership Project; Technical Specification Group Core Network and Terminals; Non-Access-Stratum (NAS) protocol for 5G System (5GS); Stage 3 (Release 16)," Technical Specification 24.501, Version 16.1.0, Jun. 2019, 541 pages.

Clausen et al., "Optimized Link State Routing Protocol (OLSR)," *Project Hipercom, INRIA*, Oct. 2003. (75 pages).

LAN/MAN Standards Committee, "Part 11: Wireless LAN Medium Access Control (MAC) and Physical Layer (PHY) Specifications; Amendment 1: Enhancements for High-Efficiency WLAN," *IEEE Standard for Information Technology—Telecommunications and Information Exchange between Systems Local and Metropolitan Area Networks—Specific Requirements*, Feb. 9, 2021. (767 pages).

\* cited by examiner

PRIVATE NETWORK

BACKGROUND

In 2015, the United States (US) Federal Communication Commission (FCC) adopted rules for shared commercial use of the 3550-3700 MHz band (3.5 GHz band). The FCC established the Citizens Broadband Radio Service (CBRS) and created a three-tiered access and authorization framework to accommodate shared federal and non-federal use of the band. Tier 1 of the CBRS access and authorization framework is called the Incumbent Access Tier, which includes authorized federal users. Tier 2 of the CBRS access and authorization framework is called the Priority Access Tier, which consists of Priority Access Licenses (PALs) that can be licensed on a county-by-county basis through competitive bidding. Each PAL consists of a 10 megahertz channel within the 3550-3650 MHz band. PALs are 10-year renewable licenses. Tier 3 of the CBRS access and authorization framework is called the General Authorized Access (GAA) Tier, which is licensed-by-rule to permit open, flexible access to the band for the widest possible group of potential users.

Conventionally, organizations can create private mobile networks using commercial carriers, which does not enable the organizations to control various aspects of the commercial carriers' networks, such as usage fees, network availability, and data security, for example. Recently, enterprises have been able to create their own private 5G networks by purchasing portions of the CBRS spectrum for their own private use, which may be referred to as "Enterprise 5G". Enterprise 5G architectures combine 5G performance with application-specific controls tailored for enterprise environments. Enterprise 5G on the CBRS spectrum does not interfere with Wi-Fi networks, which enables Wi-Fi networks and enterprise 5G networks to work together, where 5G networks are typically reserved for the most critical applications and services.

Current private networks, such as conventional Enterprise 5G networks, for example, may require a significant amount of bandwidth to be used for control channels, which reduces the throughput of such networks.

BRIEF SUMMARY

The present disclosure teaches methods, devices, and computer-readable media for forming private networks in which network throughput is not reduced by bandwidth that is used for control channels. According to the present disclosure, a group of access point devices that communicate using 5G and Wi-Fi wireless communication technologies form a private, self-optimizing network having a mesh topology. For example, the access point devices communicate over different frequency bands used for IEEE 802.11ax or Wi-Fi 6, CBRS Time Domain Duplex (TDD), and C-Band TDD communications, respectively. The access point devices can be installed anywhere and they can discover neighboring access point devices and determine the best frequency bands to use to communicate with the neighboring access point devices. The access point devices utilize licensed spectrum of n77 or C-Band (3.3 GHz to 4.2 GHz) to communicate control information and to create a mesh network topology between the access point devices, which guarantees accessibility between access point devices. A User Equipment (UE) device that connects to an access point device using Wi-Fi (e.g., Wi-Fi 6) wireless communication uses an embedded Subscriber Identity Module (SIM) (eSIM) card that stores credentials that are necessary to sign on to a preferred carrier's cellphone network. The access point devices enable roaming in and out of a private network, which enables enterprise users to effectively take their enterprise with them when they travel away from the enterprise premises, for example.

A method for enabling communications between a private network and a fifth-generation New Radio (5G NR) cellular telecommunication radio access network (RAN) according to the present disclosure may be summarized as including: transmitting, by a first Access Point (AP) device of the private network, one or more first messages using a first licensed frequency band; receiving, by the first AP device of the private network, one or more second messages using the first licensed frequency band; receiving, by the first AP device of the private network, data for a user equipment device; determining, by the first AP device of the private network, a second AP device of the private network to which the data for the user equipment device is to be transmitted based on the one or more second messages received using the first licensed frequency band; and transmitting, by the first AP device of the private network, the data for the user equipment device to the second AP device of the private network using a second licensed frequency band that is different from the first licensed frequency band or an unlicensed frequency band that is different from the first licensed frequency band and the second licensed frequency band.

An address of the second AP device of the private network may be included in at least one of the one or more second messages. An address of the user equipment device may be included in the at least one of the one or more second messages.

The method may further include determining, by the first AP device of the private network, a power level for transmitting the data for the user equipment device, and the transmitting the data for the user equipment device to the second AP device of the private network may include transmitting the data for the user equipment device using the power level that is determined.

The method may further include: determining, by the first AP device of the private network, that a signal strength associated with the second licensed frequency band is higher than a signal strength associated with the unlicensed frequency band; and determining to transmit the data for the user equipment device to the second AP device of the private network using the second licensed frequency band in response to the determining that the signal strength associated with the second licensed frequency band is higher than the signal strength associated with the unlicensed frequency band, and the transmitting the data for the user equipment device to the second AP device of the private network may include transmitting the data for the user equipment device to the second AP device of the private network using the second licensed frequency band.

The method may further include: determining, by the first AP device of the private network, that a signal strength associated with the unlicensed frequency band is higher than a signal strength associated with the second licensed frequency band; determining to transmit the data for the user equipment device to the second AP device of the private network using the unlicensed frequency band in response to the determining that the signal strength associated with the unlicensed frequency band is higher than the signal strength associated with the second licensed frequency band, and the transmitting the data for the user equipment device to the second AP device of the private network may include transmitting the data for the user equipment device to the second AP device of the private network using the unlicensed frequency band.

The first licensed frequency band may be included in a 3.3 GHz to 4.2 GHz frequency band, the second licensed frequency band may be included in a 3.55 GHz to 3.7 GHz frequency band, and the unlicensed frequency band may be a 2.4 GHz frequency band, a 5 GHz frequency band, or a 6 GHz frequency band.

The receiving the data for the user equipment device may include receiving the data for the user equipment device from a Radio Unit (RU) device included in the 5G NR cellular telecommunication RAN.

The receiving the data for the user equipment device may include receiving the data for the user equipment device from a third AP device of the private network. The method may further include transmitting, by the second AP device of the private network, the data for the user equipment device to a Radio Unit (RU) device included in the 5G NR cellular telecommunication RAN.

An access point device of a private network that communicates with a fifth-generation New Radio (5G NR) cellular telecommunication radio access network (RAN) according to the present disclosure may be summarized as including: at least one memory that stores computer executable instructions; and at least one processor that executes the computer executable instructions to cause actions to be performed, the actions including: transmit one or more first messages using a first licensed frequency band; receive one or more second messages using the first licensed frequency band; receive data for a user equipment device; determine a second AP device of the private network to which the data for the user equipment device is to be transmitted based on the one or more second messages received using the first licensed frequency band; and transmit the data for the user equipment device to the second AP device of the private network using a second licensed frequency band that is different from the first licensed frequency band or an unlicensed frequency band that is different from the first licensed frequency band and the second licensed frequency band.

An address of the second AP device of the private network and an address of the user equipment device may be included in at least one of the one or more second messages.

The actions may further include: determine that a signal strength associated with the second licensed frequency band is greater than a signal strength associated with the unlicensed frequency band, and determine to transmit the data for the user equipment device to the second AP device of the private network using the second licensed frequency band in response to determining that the signal strength associated with the second licensed frequency band is greater than the signal strength associated with the unlicensed frequency band, and data for the user equipment device may be transmitted to the second AP device of the private network using the second licensed frequency band.

The actions may further include: determine that a signal strength associated with the unlicensed frequency band is greater than a signal strength associated with the second licensed frequency band, determine to transmit the data for the user equipment device to the second AP device of the private network using the unlicensed frequency band in response to determining that the signal strength associated with the unlicensed frequency band is greater than the signal strength associated with the second licensed frequency band, wherein data for the user equipment device is transmitted to the second AP device of the private network using the unlicensed frequency band.

The first licensed frequency band may be included in a 3.3 GHz to 4.2 GHz frequency band, the second licensed frequency band may be included in a 3.55 GHz to 3.7 GHz frequency band, and the unlicensed frequency band may be a 2.4 GHz frequency band, a 5 GHz frequency band, or a 6 GHz frequency band.

A non-transitory computer-readable storage medium according to the present disclosure may be summarized as having processor-executable instructions stored thereon that, when executed by at least one processor, cause the at least one processor to cause actions to be performed by an access point device of a private network that communicates with a fifth-generation New Radio (5G NR) cellular telecommunication radio access network (RAN), the actions including: transmit one or more first messages using a first licensed frequency band; receive one or more second messages using the first licensed frequency band; receive data for a user equipment device; determine a second AP device of the private network to which the data for the user equipment device is to be transmitted based on the one or more second messages received using the first licensed frequency band; transmit the data for the user equipment device to the second AP device of the private network using a second licensed frequency band that is different from the first licensed frequency band or an unlicensed frequency band that is different from the first licensed frequency band and the second licensed frequency band.

An address of the second AP device of the private network and an address of the user equipment device may be included in at least one of the one or more second messages.

The actions may further include: determine that a signal strength associated with the second licensed frequency band is greater than a signal strength associated with the unlicensed frequency ban, and determine to transmit the data for the user equipment device to the second AP device of the private network using the second licensed frequency band in response to determining that the signal strength associated with the second licensed frequency band is greater than the signal strength associated with the unlicensed frequency band, and data for the user equipment device may be transmitted to the second AP device of the private network using the second licensed frequency band.

The actions may further include: determine that a signal strength associated with the unlicensed frequency band is greater than a signal strength associated with the second licensed frequency band, determine to transmit the data for the user equipment device to the second AP device of the private network using the unlicensed frequency band in response to determining that the signal strength associated with the unlicensed frequency band is greater than the signal strength associated with the second licensed frequency band, and data for the user equipment device is transmitted to the second AP device of the private network using the unlicensed frequency band.

The first licensed frequency band may be included in a 3.3 GHz to 4.2 GHz frequency band, the second licensed frequency band may be included in a 3.55 GHz to 3.7 GHz frequency band, and the unlicensed frequency band may be a 2.4 GHz frequency band, a 5 GHz frequency band, or a 6 GHz frequency band.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

DETAILED DESCRIPTION

The present disclosure teaches Access Point (AP) devices that interoperate to provide a private network, which can communicate with a fifth-generation New Radio (5G NR) cellular telecommunication radio access network (RAN). The AP devices utilize a control channel, which is transmitted using a first licensed frequency band (e.g., n77), to exchange messages that are used discover other AP devices and devices attached thereto (e.g., UE devices), and to determine how to route traffic within the private network using other frequency bands, which may be licensed or unlicensed.

For example, a first AP device of a private network may transmit one or more first messages using a first licensed frequency band, receive one or more second messages using the first licensed frequency band, receive data for a user equipment device, determine a second AP device of the private network to which the data for the user equipment device is to be transmitted based on the one or more second messages, determine whether to transmit the data for the user equipment device to the second AP device of the private network using a second licensed frequency band or an unlicensed frequency band, determine a power level for transmitting the data for the user equipment device to the second AP device, and transmit at the determined power level the data for the user equipment device to the second AP device of the private network using the second licensed frequency band or the unlicensed frequency band. Accordingly, private networks according to the present disclosure have a relatively high throughput compared to conventional private networks.

Figure 1:
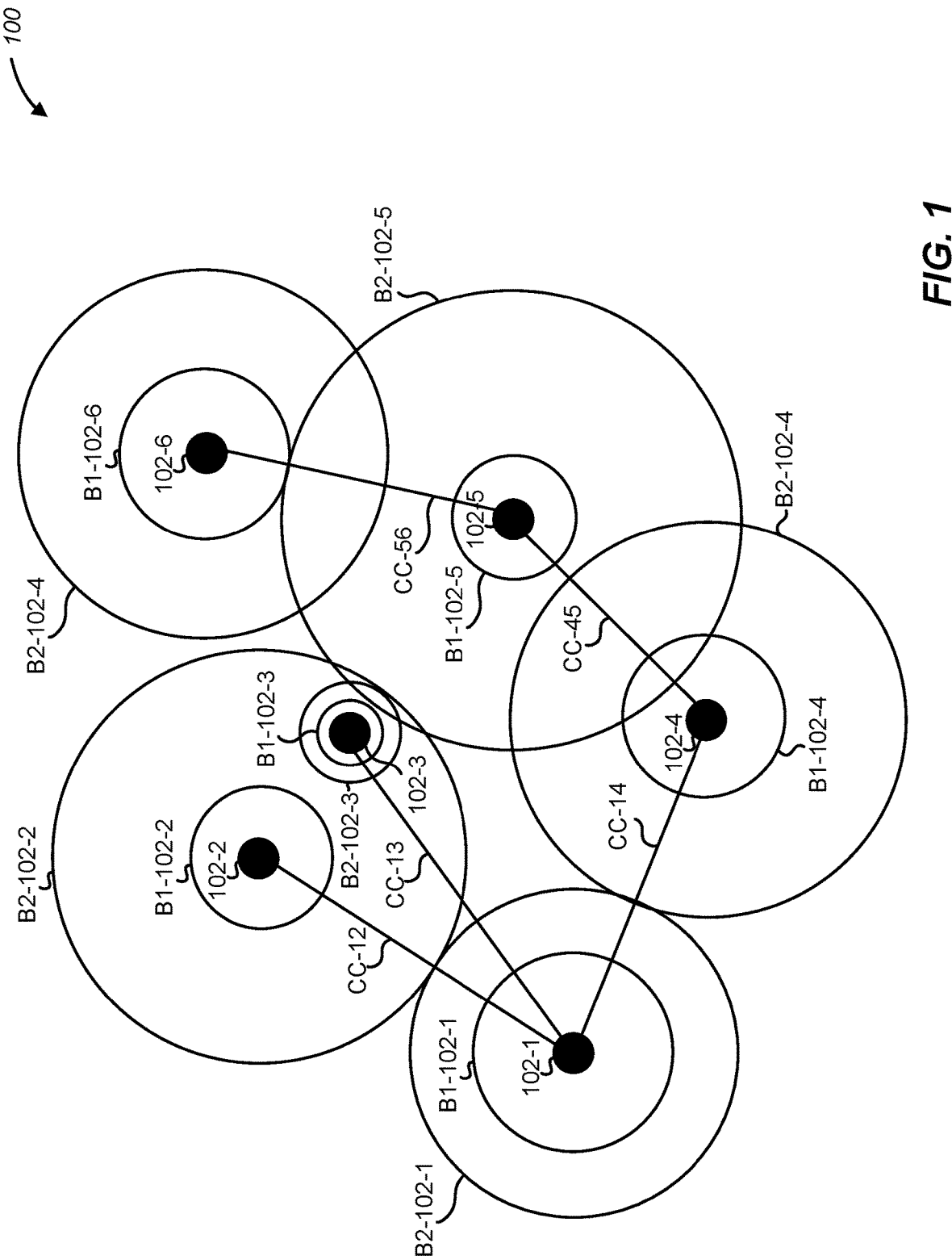
FIG. 1 is a diagram of a private network in accordance with embodiments described herein.

FIG. 1 is a diagram of a private network 100 in accordance with embodiments described herein. The private network 100 is provided by a plurality of access point devices 102-1, 102-2, 102-3, 102-4, 102-5, and 102-6. Each of the access point devices 102-1, 102-2, 102-3, 102-4, 102-5, and 102-6 communicates using a plurality of different frequency bands. Some of the frequency bands are unlicensed and some are licensed. For example, each of the access point devices 102-1, 102-2, 102-3, 102-4, 102-5, and 102-6 communicates using a first set of one or more frequencies included in a first unlicensed band included in a portion of C-Band, which is referred to as band n77 of the 5G NR frequency bands. The third set of one or more frequencies included in the unlicensed frequency band may include one or more channels having bandwidths of 10, 15, 20, 25, 30, or more MHz, for example. Also, each of the access point devices 102-1, 102-2, 102-3, 102-4, 102-5, and 102-6 communicates using a second set of one or more frequencies included in a second licensed frequency band allocated to Citizens Broadband Radio Service (CBRS), which is referred to as band n48 in the 5G New Radio (NR) frequency bands. The second set of one or more frequencies may be included in one or more frequency bands in Tier 2 of the CBRS for Priority Access, which are licensed on a county-by-county basis through competitive bidding using Priority Access Licenses (PALs), wherein each PAL consists of a 10 MHz channel within the 3550-3650 MHz band, for example. The second set of one or more frequencies may also be included one or more frequency bands in Tier 3 of the CBRS for General Authorized Access (GAA), which may include one or more MHz or 20 MHz channels throughout the 3550-3700 MHz band, for example. In addition, each of the access point devices 102-1, 102-2, 102-3, 102-4, 102-5, and 102-6 communicates using a third set of one or more frequencies included in one or more frequency bands used in wireless communication according to the IEEE 802.11ax communication standard, which may be referred to the Wi-Fi 6 communication standard. The frequency bands used in wireless communication according to the IEEE 802.11ax communication standard are unlicensed 2.4 GHz and 5 GHz frequency bands. The third set of one or more frequency bands may include one or more sub-bands or channels in the 2.4 GHz and 5 GHz frequency bands. Additionally or alternatively, the unlicensed 2.4 GHz and 5 GHz frequency bands may include one or more frequency sub-bands in the 6 GHz, which are used for Wi-Fi 6E communications.

In the example of FIG. 1, the access point device 102-1 communicates using the third set of one or more frequencies included in the unlicensed frequency band to provide a first coverage area B1-102-1, and communicates using the second set of one or more frequencies included in the second licensed frequency band to provide a second coverage area B2-102-1. The sizes of the coverage areas B1-102-1 and B2-102-1 depend on the particular frequencies included in the third band and the second band, and the respective transmit powers at which the access point device 102-1 transmits the third band and the second band. The access point device 102-1 can communicate with various User Equipment (UE) devices (not shown in FIG. 1) that are located with the coverage areas B1-102-1 and B2-102-1, and forward information received from the UE devices to other UE devices or to other access point devices.

Similarly, the access point device 102-2 communicates using the third set of one or more frequencies included in the unsilenced frequency band to provide a first coverage area B1-102-2, and communicates using the second set of one or more frequencies included in the second unlicensed frequency band to provide a second coverage area B2-102-2. The access point device 102-3 communicates using the third set of one or more frequencies included in the unlicensed frequency band to provide a first coverage area B1-102-3, and communicates using the second set of one or more frequencies included in the second unlicensed frequency band to provide a second coverage area B2-102-3. The access point device 102-4 communicates using the third set of one or more frequencies included in the unlicensed frequency band to provide a first coverage area B1-102-4, and communicates using the second set of one or more frequencies included in the second unlicensed frequency band to provide a second coverage area B2-102-4. The access point device 102-5 communicates using the third set of one or more frequencies included in the unlicensed frequency band to provide a first coverage area B1-102-5, and communicates using the second set of one or more frequencies included in the second unlicensed frequency band to provide a second coverage area B2-102-5. The access point device 102-6 communicates using the third set of one or more frequencies included in the unlicensed frequency band to provide a first coverage area B1-102-6, and communicates using the second set of one or more frequencies included in the second unlicensed frequency band to provide a second coverage area B2-102-6.

Each of the access point devices 102-1, 102-2, 102-3, 102-4, 102-5, and 102-6 communicates control information for managing the private network 100 using one or more frequencies included in the first licensed frequency band (e.g., n77). More particularly, the control information is transmitted between the access point devices 102-1 and 102-2 using a control channel link CC-12, the control information is transmitted between the access point devices 102-1 and 102-3 using a control channel link CC-13, and the control information is transmitted between the access point devices 102-1 and 102-4 using a control channel link CC-14. Also, the control information is transmitted between the access point devices 102-4 and 102-5 using a control channel link CC-45. In addition, the control information is transmitted between the access point devices 102-5 and 102-6 using a control channel link CC-56. The control information includes information that is used by the access point devices 102-1, 102-2, 102-3, 102-4, 102-5, and 102-6 to form the private network 100 in a mesh network topology, and to determine how to route traffic to other access point devices.

In one or more implementations, each of the access point devices 102-1, 102-2, 102-3, 102-4, 102-5, and 102-6 are programmed to implement a version of RFC 3626 (e.g., Optimized Link State Routing (OLSR) Protocol) that is modified in accordance with the present disclosure. Using the modified version of the OLSR Protocol, each of the access point devices 102-1, 102-2, 102-3, 102-4, 102-5, and 102-6 periodically floods status of its links, and re-broadcasts link state information received from its neighbors. Also, each of the access point devices 102-1, 102-2, 102-3, 102-4, 102-5, and 102-6 keeps track of link state information received from other nodes, and uses that information to determine a next hop to each destination access point device. More particularly, the OLSR Protocol uses "Hello" messages and "Topology Control" (TC) messages to discover and disseminate link state information throughout the private network 100, wherein each of the access point devices 102-1, 102-2, 102-3, 102-4, 102-5, and 102-6 uses topology information to compute next hop destinations for all nodes in the private network 100 using shortest hop forwarding paths. Also, modified versions of the Open Shortest Path First (OSPF) Protocol and Intermediate System to Intermediate System (IS-IS) Protocol may be used to elect a designated access point device on every link to perform flooding of topology information. The instance of the OLSR protocol running on each of the access point devices 102-1, 102-2, 102-3, 102-4, 102-5, and 102-6 uses Hello messages to discover 2-hop neighbor information and perform a distributed election of a set of multipoint relay (MPR) devices, which source and forward TC messages that contain MPR selectors. Accordingly, each of the access point devices 102-1, 102-2, 102-3, 102-4, 102-5, and 102-6 is able to determine neighbors that are one or two hops away, and to select MPR devices that are one hop away and that offer the best routes to access point devices that are two hops away.

Using addresses (e.g., Internet Protocol (IP) addresses) included in the TC messages, each of the access point devices 102-1, 102-2, 102-3, 102-4, 102-5, and 102-6 maintains a routing table that is used to route data to other access point devices in the private network 100. Each entry in such a routing table includes, for example, an R_dest_addr field, an R_next_addr field, an R_dist field, and an R_iface_addr, wherein the node identified by the R_dest_addr field is estimated to be a number of hops identified by the R_dist field away from the local access point device, and the access point device with an interface address identified by the R_next_addr field is the next hop node in the route to the node identified by the R_dest_addr and is reachable through the local interface with the address identified by the R_iface_addr field.

The access point devices 102-1, 102-2, 102-3, 102-4, 102-5, and 102-6 may use other protocols to discover the topology of the private network 100. For example, each of the access point devices 102-1, 102-2, 102-3, 102-4, 102-5, and 102-6 may be programmed to implement a version of the Better Approach to Mobile Ad-hoc Networking (B.A.T.M.A.N.) Protocol that is modified in accordance with the present disclosure. By way of another example, each of the access point devices 102-1, 102-2, 102-3, 102-4, 102-5, and 102-6 may be programmed to implement a version of the Hybrid Wireless Mesh Protocol (HWMP) that is modified in accordance with the present disclosure. The access point devices 102-1, 102-2, 102-3, 102-4, 102-5, and 102-6 may use other protocols for forming a mesh network topology and routing data within the mesh network topology without departing from the scope of the present disclosure.

Figure 2:
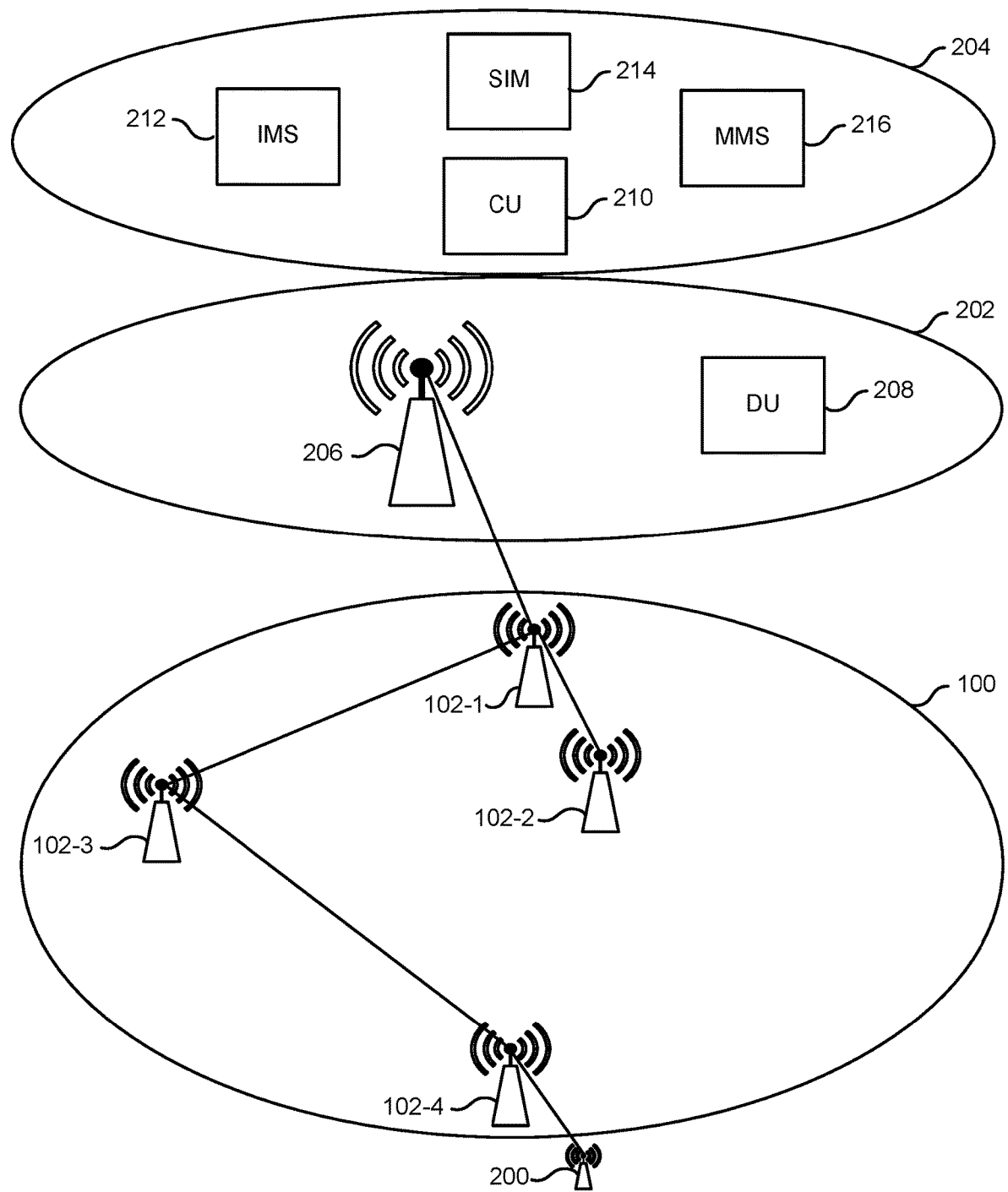
FIG. 2 is a diagram for explaining operation of a private network in accordance with embodiments described herein.

FIG. 2 is a diagram for explaining operation of a private network 100 in accordance with embodiments described herein. The private network 100 is provided by an access point device 102-1 that communicates with an access point device 102-2 and an access point device 102-3. The access point device 102-3 communicates with an access point device 102-4, which communicates with a User Equipment (UE) device 200. The private network 100 is connected with a Radio Access Network (RAN) 202, which is connected with a core network 204. More particularly, the access point device 102-1 communicates with a Radio Unit (RU) device 206, which is controlled by a Distributed Unit (DU) device 208. The DU device 208 is controlled by a Centralized Unit (CU) device 210, which is implemented in a cloud computing environment (e.g., Amazon Web Services). Also implemented in the cloud computing environment is an IP Multimedia Subsystem (IMS) device 212, a Subscriber Identity Module (SIM) device 214, and a Mobility Managed Services (MMS) device 216. The IMS device 212 implements a control plan that handles call related signaling and controls transport plane, including Call Session Control Function (CSCF). The SIM device 214 performs functions for authenticating devices that join the private network 100 such as the UE device 200. For example, the SIM device 214 authenticates a UE device if the SIM device 214 determines that one or more of an encryption key, a Public Land Mobile Network (PLMN) identifier, and an International Mobile Subscriber Identity (IMSI) stored in an eSIM included in the UE device matches corresponding information stored by a Home Location Register (HLR) or a Home Subscriber Server (HSS). The MMS device 216 performs a packet protocol for mobility management, which includes establishing connection and moving between base stations, and session management, which includes connecting to networks and network slices, and is described in TS 24.501.

The UE device 200 includes an embedded SIM (eSIM) that stored information such as identifier and encryption keys that are used by the SIM device 214 to authenticate the UE 200 when the UE device 200 initially connects to the access point device 102-4. If a user of the UE device 200 makes a voice call, for example, the IMS device 212 handles call related signaling for routing voice traffic between the UE device 200 and a remote device (not shown). If the UE device 200 moves to a different location the MMS device 216 may coordinate a handover of the UE device to a different access point device.

Figure 3:
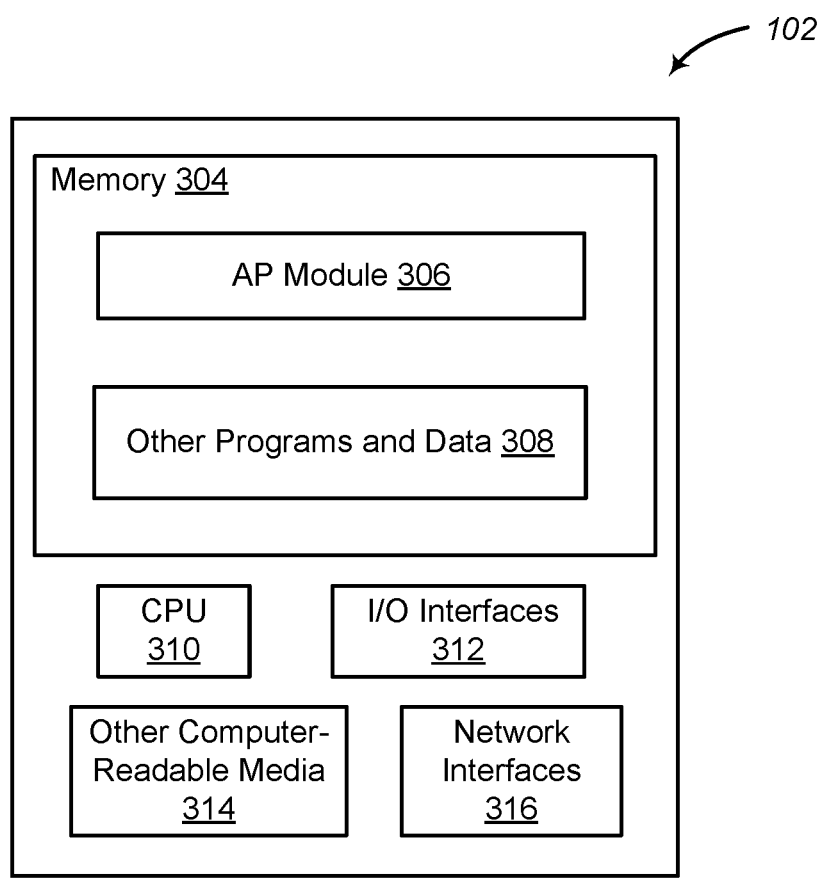
FIG. 3 is a block diagram illustrating an example of an Access Point (AP) device in accordance with embodiments described herein.

FIG. 3 is a block diagram illustrating an example of an Access Point (AP) device 102 in accordance with embodiments described herein. In some embodiments, one or more special-purpose computing systems may be used to implement the AP device 102. Accordingly, various embodiments described herein may be implemented in software, hardware, firmware, or in some combination thereof. The AP device 102 may include one or more memory devices 304, one or more central processing units (CPUs) 310, I/O interfaces 312, other computer-readable media 314, and network interfaces 316.

The one or more memory devices 304 may include one or more various types of non-volatile and/or volatile storage technologies. Examples of the one or more memory devices 304 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 304 may be utilized to store information, including computer-readable instructions that are utilized by the one or more CPUs 310 to perform actions, including those of embodiments described herein.

The one or more memory devices 304 may have stored thereon an Access Point (AP) module 306. The AP module 306 is configured to implement and/or perform some or all of the functions of the AP device 102 described herein. The one or more memory devices 304 may also store other programs and data 308, which may include digital certificates, connection recovery algorithms, connection recovery rules, network protocols, O-RAN operating rules, user interfaces, operating systems, etc.

I/O interfaces 312 may include enhanced Common Public Radio Interface (eCPRI) ports, Antenna Interface Standards Group (AISG) interfaces, other data input or output interfaces, or the like. Other computer-readable media 314 may include other types of stationary or removable computer-readable media, such as removable flash drives, external hard drives, or the like. Network interfaces 316 are configured to communicate with other computing devices including Radio Unit (RU) devices, User Equipment (UE) devices, and other Access Point (AP) devices. In various embodiments, the network interfaces 316 include transmitters and receivers, a layer 2 (L2) switch and physical network ports (not illustrated) to send and receive data as described herein, and to send and receive instructions, commands and data to implement the processes described herein.

Figure 4:
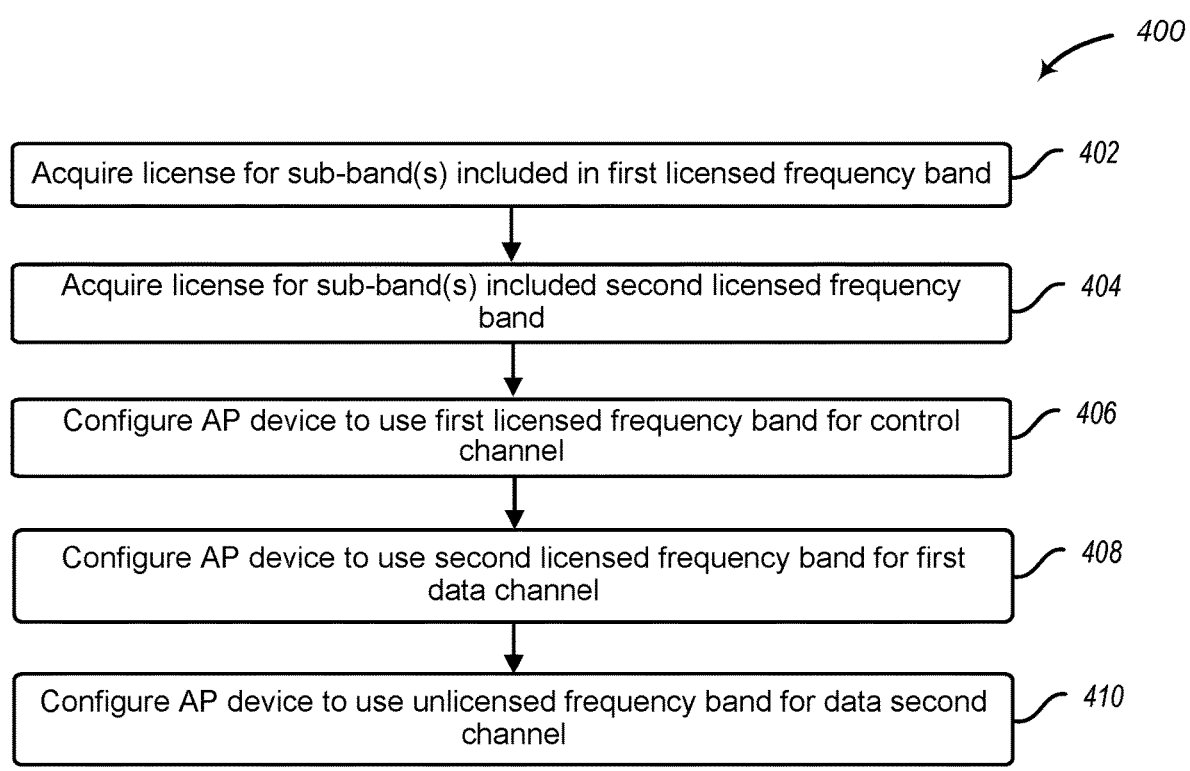
FIG. 4 illustrates a logical flow diagram showing an example of a method of configuring an Access Point (AP) device in accordance with embodiments described herein.

FIG. 4 illustrates a logical flow diagram showing an example of a method 400 of configuring an Access Point device in accordance with embodiments described herein. The method 400 begins at 402.

At 402, one or more licenses for one or more frequencies included in a first licensed frequency band is acquired. For example, a manufacturer or distributor of the Access Point (AP) device 102 shown in FIG. 3 acquires public access licenses for one or more 10 MHz or 30 MHz sub-bands included in 5G New Radio (NR) frequency band n77 in every county in the United States from the Federal Communications Commission (FCC) in the United States. The method then proceeds to 404.

At 404, one or more licenses for one or more frequencies included in a second licensed frequency band is acquired. For example, the manufacturer or distributor of the Access Point (AP) device 102 shown in FIG. 3 acquires public access licenses for one or more 10 MHz or 30 MHz sub-bands included in 5G New NR frequency band n48 in every county in the United States from the FCC in the United States. The method then proceeds to 406.

At 406, an Access Point (AP) device is configured to use the first licensed frequency band for a control channel. For example, a numeric identifier of the control channel and numeric identifiers of each of the one or more frequency sub-bands included in the first licensed frequency band are saved in a file or other suitable data structure that is stored in the memory 304 of the AP device 102. The method then proceeds to 408.

At 408, the AP device is configured to use the second licensed frequency band for a first data channel. For example, a numeric identifier of the first data channel and numeric identifiers of each of the second licensed frequency band(s) are saved in a file or other suitable data structure that is stored in the memory 304 of the AP device 102. The method then proceeds to 410.

At 410, the AP device is configured to use unlicensed frequency band(s) for a data second channel. For example, a numeric identifier of the second data channel and numeric identifiers of each of the sub-band(s) of the unlicensed frequency band are saved in a file or other suitable data structure that is stored in the memory 304 of the AP device 102. In one or more implementations, the unlicensed frequency band include one or more sub-bands of the 2.4 GHz, 5 GHz, and 6 GHz frequency bands used for Wi-Fi (e.g., Wi-Fi 6, Wi-Fi 6E) communications. The method 400 then ends.

Figure 5:
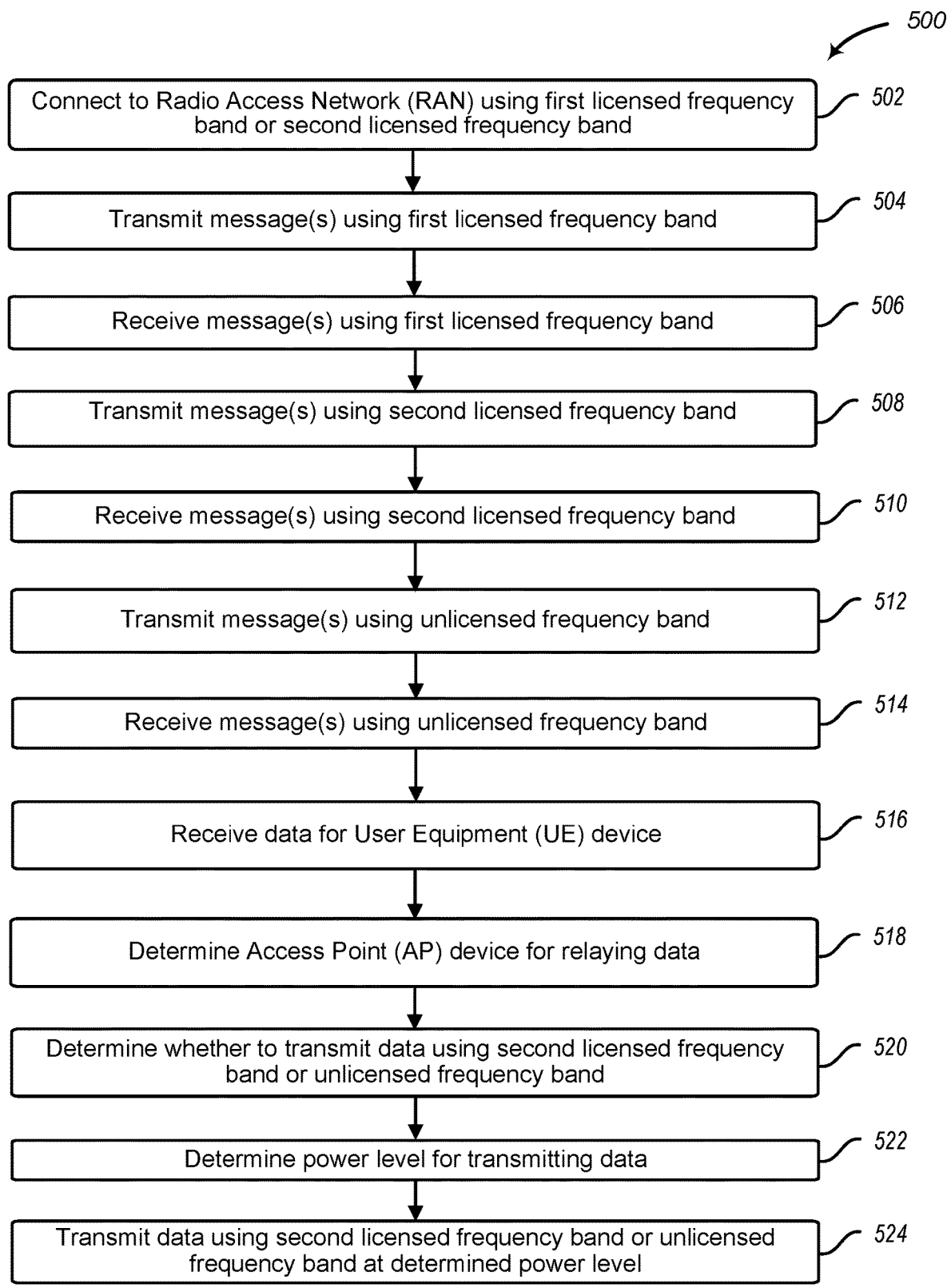
FIG. 5 illustrates a logical flow diagram showing an example of a method of operating an Access Point (AP) device in accordance with embodiments described herein.

FIG. 5 illustrates a logical flow diagram showing an example of a method 500 of operating an Access Point (AP) device in accordance with embodiments described herein. The method 500 begins at 502.

At 502, an Access Point (AP) device connects to a Radio Access Network (RAN) using a first licensed frequency band or a second licensed frequency band. For example, the AP device 102-1 shown in FIG. 2 connects to the RAN 202 by exchanging messages using one or more sub-bands included in the first licensed frequency band with the Radio Unit (RU) device 200 according to 5G communications standards. The method 500 then proceeds to 504.

At 504, the AP device transmits one or more messages using the first licensed frequency band. For example, the AP device 102-1 shown in FIG. 2 transmits one or more Hello messages according to RFC 3626 to the AP device 102-2 and the AP device 102-3 using one or more sub-bands included in NR frequency band n77. The method 500 then proceeds to 506.

At 506, the AP device receives one or more messages using the first licensed frequency band. For example, the AP device 102-1 shown in FIG. 2 receives one or more Hello messages and/or one or more Topology Control according to RFC 3626 from the AP device 102-2 and the AP device 102-3 using one or more sub-bands included in NR frequency band n77. The method 500 then proceeds to 508.

At 508, the AP device transmits one or more messages using the second licensed frequency band. For example, the AP device 102-1 shown in FIG. 2 transmits one or more Hello messages according to RFC 3626 to the AP device 102-2 and the AP device 102-3 using one or more sub-bands included in the NR frequency band n48. The method 500 then proceeds to 510.

At 510, the AP device receives one or more messages using the second licensed frequency band. For example, the AP device 102-1 shown in FIG. 2 receives one or more Hello messages and/or one or more Topology Control according to RFC 3626 from the AP device 102-2 and the AP device 102-3 using one or more sub-bands included in the NR frequency band n48. The method 500 then proceeds to 512.

At 512, the AP device transmits one or more messages using an unlicensed frequency band. For example, the AP device 102-1 shown in FIG. 2 transmits one or more Hello messages according to RFC 3626 to the AP device 102-2 and the AP device 102-3 using one or more frequencies included in the 2.4 GHz, 5 GHz, or 6 GHz bands. The method 500 then proceeds to 514.

At 514, the AP device receives one or more messages using one or more unlicensed frequency bands. For example, the AP device 102-1 shown in FIG. 2 receives one or more Hello messages and/or one or more Topology Control according to RFC 3626 from the AP device 102-2 and the AP device 102-3 using one or more frequencies included in the 2.4 GHz, 5 GHz, or 6 GHz bands. The method 500 then proceeds to 516.

At 516, data for a User Equipment (UE) device is received. For example, the AP device 102-1 shown in FIG. 2 receives user data for the UE device 200 received from the RU device 206. The method 500 then proceeds to 518.

At 518, an address of an Access Point (AP) device for relaying the data received at 516 is determined. For example, user data received at 516 has a destination address corresponding to the UE device 200 shown in FIG. 2, and the AP device 102-1 determines, based on an address of the AP device 102-4 and an address of the UE device 200 included in a Topology Control message received at 506, that the UE device 200 is connected to the AP device 102-4. The AP device 102-1 may then determine, based on information included in a Topology Control message received at 506, that the user data for the UE device 200 should be transmitted to an address associated with the AP device 102-3 because it is connected to the AP device 102-4. The method 500 then proceeds to 520.

At 520, whether to transmit data using the second licensed frequency band or the unlicensed frequency bands is determined. For example, the AP device 102-1 shown in FIG. 2 determines whether to transmit the user data for the UE device 200 received at 516 to the AP device determined at 518 using one or more sub-bands included in the 5G NR frequency band n48 or one or more sub-bands included in the 2.4 GHz, 5 GHz, or 6 GHz bands. By way of example, the AP device 102-1 may determine, based on values (e.g., Signal-To-Noise Ratio (SNR) values, Signal-To-Interference-Plus-Noise Ratio (SINR) values, etc.) included in one or more messages received at 514, which are calculated at the AP devices that transmit those messages based on reception of the messages transmitted by the AP device 102-1 at 512, whether to transmit the user data for the UE device 200 received at 516 using one or more sub-bands included in the 5G NR frequency band n48 or one or more sub-bands included in the 2.4 GHz, 5 GHz, or 6 GHz frequency bands. By way of another example, the AP device 102-1 may determine, based on values (e.g., SNR, SINR, etc.) generated at the AP device 102-1 when the messages are received at 514 by a receiver of the AP device 102-1, whether to transmit the user data for the UE device 200 received at 516 using one or more sub-bands included in the 5G NR frequency band n48 or one or more sub-bands included in the 2.4 GHz, 5 GHz, or 6 GHz frequency bands. For example, the AP device 102-1 determines that the 2.4 GHz, 5 GHz, or 6 GHz frequency bands should be used because a signal strength (e.g., Signal-To-Noise Ratio (SNR), SINR, etc.) associated with the 2.4 GHz, 5 GHz, or 6 GHz frequency bands (e.g., included in a message received using the 4 GHz or 5 GHz frequency bands) is greater than a signal strength associated with the 5G NR frequency band n48 (e.g., included in a message received using the 5G NR frequency band n48). Stated differently, the AP device 102-1 determines that the one or more sub-bands included in the 2.4 GHz, 5 GHz or 6 GHz frequency bands should be used because there is less interferences and higher throughput associated with the one or more sub-bands included the 2.4 GHz, 5 GHz, or 6 GHz frequency bands than the one or more sub-bands included in the 5G NR frequency band n48. The method 500 then proceeds to 522.

At 522, a power level for transmitting data is determined. For example, the AP device 102-1 shown in FIG. 2 determines a power level to be used to transmit the user data for the UE device 200 received at 516 based on the particular frequency band that is to be used to transmit the data. The AP device 102-1 may store a table or other suitable data structure for each of the frequency bands (e.g., n77, n48, or Wi-Fi 6) that includes a plurality of SINR values or ranges of values associated with corresponding power levels to be used, wherein the corresponding power levels have been calculated to ensure that respective messages transmitted at that those power levels would have a sufficiently high probably (e.g., greater than a threshold value) of being decoded at a receiver without retransmission. The method 500 then proceeds to 524.

At 524, the data received at 516 is transmitted using one or more sub-bands included in the second licensed frequency band or one or more sub-bands included the unlicensed frequency band that is determined at 520, at the power level that is determined at 522. For example, the AP device 102-1 shown in FIG. 2 transmits the user data for the UE device 200 using one or more sub-bands included in the 2.4 GHz, 5 GHz, or 6 GHz frequency bands at a minimum power level. The method 500 then ends.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for enabling communications between a private network and a fifth-generation New Radio (5G NR) cellular telecommunication radio access network (RAN), the method comprising:

transmitting, by a first Access Point (AP) device of the private network, one or more first messages to other AP devices of the private network using a first licensed frequency band;

receiving, by the first AP device of the private network, one or more second messages from other AP devices of the private network using the first licensed frequency band;

receiving, by the first AP device of the private network, data from a radio unit that is outside the private network for a user equipment device that is in communication with a second AP device of the private network, wherein the data is separate from the one or more second messages;

determining, by the first AP device of the private network, the second AP device of the private network to which the data for the user equipment device is to be transmitted based on the one or more second messages received using the first licensed frequency band; and transmitting, by the first AP device of the private network, the data for the user equipment device to the second AP device of the private network using a second licensed frequency band that is different from the first licensed frequency band or an unlicensed frequency band that is different from the first licensed frequency band and the second licensed frequency band.

2. The method of claim 1 wherein an address of the second AP device of the private network is included in at least one of the one or more second messages.

3. The method of claim 2 wherein an address of the user equipment device is included in the at least one of the one or more second messages.

4. The method of claim 1, further comprising:
determining, by the first AP device of the private network, a power level for transmitting the data for the user equipment device,
wherein the transmitting the data for the user equipment device to the second AP device of the private network includes transmitting the data for the user equipment device using the power level that is determined.

5. The method of claim 1, further comprising:
determining, by the first AP device of the private network, that a signal strength associated with the second licensed frequency band is higher than a signal strength associated with the unlicensed frequency band; and
determining to transmit the data for the user equipment device to the second AP device of the private network using the second licensed frequency band in response to the determining that the signal strength associated with the second licensed frequency band is higher than the signal strength associated with the unlicensed frequency band,
wherein the transmitting the data for the user equipment device to the second AP device of the private network includes transmitting the data for the user equipment device to the second AP device of the private network using the second licensed frequency band.

6. The method of claim 1, further comprising:
determining, by the first AP device of the private network, that a signal strength associated with the unlicensed frequency band is higher than a signal strength associated with the second licensed frequency band;
determining to transmit the data for the user equipment device to the second AP device of the private network using the unlicensed frequency band in response to the determining that the signal strength associated with the unlicensed frequency band is higher than the signal strength associated with the second licensed frequency band,
wherein the transmitting the data for the user equipment device to the second AP device of the private network includes transmitting the data for the user equipment device to the second AP device of the private network using the unlicensed frequency band.

7. The method of claim 1 wherein:
the first licensed frequency band is included in a 3.3 GHz to 4.2 GHz frequency band,
the second licensed frequency band is included in a 3.55 GHz to 3.7 GHz frequency band, and
the unlicensed frequency band is a 2.4 GHz frequency band, a 5 GHz frequency band, or a 6 GHz frequency band.

8. The method of claim 1 wherein the radio unit is included in the 5G NR cellular telecommunication RAN.

9. The method of claim 1, further comprising: transmitting, by the second AP device of the private network, the data for the user equipment device to a Radio Unit (RU) device included in the 5G NR cellular telecommunication RAN.

10. An access point (AP) device of a private network that communicates with a fifth-generation New Radio (5G NR) cellular telecommunication radio access network (RAN), the access point device comprising:
at least one memory that stores computer executable instructions; and
at least one processor that executes the computer executable instructions to cause actions to be performed, the actions including:
transmit one or more first messages to other AP devices of the private network using a first licensed frequency band;
receive one or more second messages from other AP devices of the private network using the first licensed frequency band;
receive data from a radio unit that is outside the private network for a user equipment device that is in communication with a second AP device of the private network, wherein the data is separate from the one or more second messages;
determine the second AP device of the private network to which the data for the user equipment device is to be transmitted based on the one or more second messages received using the first licensed frequency band; and
transmit the data for the user equipment device to the second AP device of the private network using a second licensed frequency band that is different from the first licensed frequency band or an unlicensed frequency band that is different from the first licensed frequency band and the second licensed frequency band.

11. The access point device of claim 10 wherein an address of the second AP device of the private network and an address of the user equipment device are included in at least one of the one or more second messages.

12. The access point device of claim 10 wherein the actions further include:
determine that a signal strength associated with the second licensed frequency band is greater than a signal strength associated with the unlicensed frequency band, and
determine to transmit the data for the user equipment device to the second AP device of the private network using the second licensed frequency band in response to determining that the signal strength associated with the second licensed frequency band is greater than the signal strength associated with the unlicensed frequency band, wherein data for the user equipment device is transmitted to the second AP device of the private network using the second licensed frequency band.

13. The access point device of claim 10 wherein the actions further include:
   determine that a signal strength associated with the unlicensed frequency band is greater than a signal strength associated with the second licensed frequency band,
   determine to transmit the data for the user equipment device to the second AP device of the private network using the unlicensed frequency band in response to determining that the signal strength associated with the unlicensed frequency band is greater than the signal strength associated with the second licensed frequency band,
   wherein data for the user equipment device is transmitted to the second AP device of the private network using the unlicensed frequency band.

14. The access point device of claim 10 wherein:
   the first licensed frequency band is included in a 3.3 GHz to 4.2 GHz frequency band,
   the second licensed frequency band is included in a 3.55 GHz to 3.7 GHz frequency band, and
   the unlicensed frequency band is a 2.4 GHz frequency band, a 5 GHz frequency band, or a 6 GHz frequency band.

15. A non-transitory computer-readable storage medium having processor-executable instructions stored thereon that, when executed by at least one processor, cause the at least one processor to cause actions to be performed by an access point (AP) device of a private network that communicates with a fifth-generation New Radio (5G NR) cellular telecommunication radio access network (RAN), the actions including:
   transmit one or more first messages to other AP devices of the private network using a first licensed frequency band;
   receive one or more second messages from other AP devices of the private network using the first licensed frequency band;
   receive data from a radio unit that is outside the private network for a user equipment device that is in communication with a second AP device of the private network, wherein the data is separate from the one or more second messages;
   determine the second AP device of the private network to which the data for the user equipment device is to be transmitted based on the one or more second messages received using the first licensed frequency band;
   transmit the data for the user equipment device to the second AP device of the private network using a second licensed frequency band that is different from the first licensed frequency band or an unlicensed frequency band that is different from the first licensed frequency band and the second licensed frequency band.

16. The computer-readable storage medium of claim 15 wherein an address of the second AP device of the private network and an address of the user equipment device are included in at least one of the one or more second messages.

17. The computer-readable storage medium of claim 15 wherein the actions further include:
   determine that a signal strength associated with the second licensed frequency band is greater than a signal strength associated with the unlicensed frequency band, and
   determine to transmit the data for the user equipment device to the second AP device of the private network using the second licensed frequency band in response to determining that the signal strength associated with the second licensed frequency band is greater than the signal strength associated with the unlicensed frequency band,
   wherein data for the user equipment device is transmitted to the second AP device of the private network using the second licensed frequency band.

18. The computer-readable storage medium of claim 15 wherein the actions further include:
   determine that a signal strength associated with the unlicensed frequency band is greater than a signal strength associated with the second licensed frequency band,
   determine to transmit the data for the user equipment device to the second AP device of the private network using the unlicensed frequency band in response to determining that the signal strength associated with the unlicensed frequency band is greater than the signal strength associated with the second licensed frequency band,
   wherein data for the user equipment device is transmitted to the second AP device of the private network using the unlicensed frequency band.

19. The computer-readable storage medium of claim 15 wherein:
   the first licensed frequency band is included in a 3.3 GHz to 4.2 GHz frequency band,
   the second licensed frequency band is included in a 3.55 GHz to 3.7 GHz frequency band, and
   the unlicensed frequency band is a 2.4 GHz frequency band, a 5 GHz frequency band, or a 6 GHz frequency band.

* * * * *